(12) United States Patent
Frantz et al.

(10) Patent No.: US 6,542,856 B2
(45) Date of Patent: Apr. 1, 2003

(54) SYSTEM AND METHOD FOR MONITORING GAS TURBINE PLANTS

(75) Inventors: Richard Lamar Frantz, West Chester, OH (US); Stephen Richard Hunt, deceased, late of Milford, OH (US), by Karen Lee Hunt, legal representative (73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/882,628

(22) Filed: Jun. 15, 2001

(65) Prior Publication Data

US 2002/0193969 A1 Dec. 19, 2002

(51) Int. Cl.$^7$ ................................................. G06F 7/06
(52) U.S. Cl. ..................... 702/188; 702/130; 702/138; 702/141; 702/142
(58) Field of Search .................. 702/33–35, 41–44, 702/56, 130, 138, 141, 142, 188

(56) References Cited

U.S. PATENT DOCUMENTS

| | | | |
|---|---|---|---|
| 5,329,465 A | * 7/1994 | Arcella et al. ............... | 137/554 |
| 5,428,555 A | 6/1995 | Starkey et al. | |
| 5,473,644 A | 12/1995 | Yasuoka et al. | |
| 5,548,528 A | 8/1996 | Keeler et al. | |
| 5,631,825 A | 5/1997 | Van Weele et al. | |
| 5,634,039 A | * 5/1997 | Simon et al. ............... | 376/216 |
| 5,642,000 A | 6/1997 | Jean-Jumeau et al. | |
| 5,838,588 A | * 11/1998 | Santoso et al. ............. | 700/287 |
| 5,854,749 A | 12/1998 | Kellams et al. | |
| 5,854,993 A | 12/1998 | Grichnik | |
| 5,930,315 A | 7/1999 | Morman et al. | |
| 5,963,884 A | * 10/1999 | Billington et al. ............ | 702/56 |
| 5,995,916 A | * 11/1999 | Nixon et al. ................ | 700/117 |
| 5,999,894 A | 12/1999 | Mederer et al. | |
| 6,029,092 A | 2/2000 | Stein | |
| 6,108,616 A | 8/2000 | Borchers et al. | |
| 6,125,312 A | 9/2000 | Nguyen et al. | |
| 6,147,601 A | 11/2000 | Sandelman et al. | |
| 6,199,018 B1 | 3/2001 | Quist et al. | |
| 6,223,098 B1 | 4/2001 | Cheong et al. | |
| 6,236,698 B1 | 5/2001 | Hirukawa et al. | |
| 6,263,255 B1 | 7/2001 | Tan et al. | |
| 6,298,308 B1 | * 10/2001 | Reid et al. .................. | 702/188 |
| 6,338,152 B1 | * 1/2002 | Fera et al. .................. | 709/207 |
| 2002/0077711 A1 | * 6/2002 | Nixon et al. ................. | 700/51 |

* cited by examiner

*Primary Examiner*—Marc S. Hoff
*Assistant Examiner*—Felix Suarez
(74) *Attorney, Agent, or Firm*—William Scott Andes; Armstrong Teasdale LL (57) ABSTRACT

A web-based system monitors a plurality of different gas turbine plants and includes a server system that summarizes data from a plurality of plants. The system also includes a client system including a browser and a storage device for storing information. The server system is configured to be coupled to the client system and retrieves operational data from the plurality of gas turbine plants, stores the data in the centralized database, and generates graphical representations of the operational data based on the stored data. More specifically, operational data from a plurality of turbine plants is summarized and viewable remotely with the server system.

19 Claims, 7 Drawing Sheets

SYSTEM AND METHOD FOR MONITORING GAS TURBINE PLANTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND OF THE INVENTION

This invention relates generally to monitoring turbine plants, and more particularly, to network-based systems and methods for remotely monitoring a plurality of turbine plants.

As power generation demands have increased, there also has been an increased need for assessing operating conditions of power generation turbine plants. Accurately assessing operating conditions facilitates accurate prediction of potential problems, troubleshooting existing problems, and predicting future power generation shortfalls.

Gas turbine engines used for power generation include a plurality of sensors which monitor key engine parameters and associated components, including generator sets, pump sets, and compressor sets. The signals generated by the sensors are transmitted to a monitoring system within the plant. At least some known monitoring systems are coupled to local intranets which enable users within the plant to view the data. Original equipment manufacturers and support personnel remote from the plants may only have limited access to such data.

To provide operational data to support personnel remote from the plants, at least some monitoring systems are connected in wide area networks, e.g., the Internet, so that such remote users can view data from remote locations. However, local customer access is precluded by such monitoring systems and is limited to local users that have access to the internet and have security access to the monitoring system. Furthermore, such systems permit only data from one plant to be viewed at a time, and data retrieved from a plurality of plants is only simultaneously viewable using multiple monitoring systems, multiple applications, or with multiple viewing locations.

BRIEF SUMMARY OF THE INVENTION

In one aspect, a web-based system that monitors a plurality of different gas turbine plants and includes a server system that processes data from a plurality of plants is provided. The web-based system also includes a client sub-system including a browser and a storage device for storing information. The server system is configured to be coupled to the client sub-system and retrieves operational data from the plurality of gas turbine plants, stores the data in the centralized database, and generates graphical representations of the operational data based on the stored data. More specifically, operational data from a plurality of turbine plants is compiled such that operational data retrieved from a plurality of plants is concurrently viewable. The web-based system creates a central repository of operational data for users to access and view operational data from a plurality of plants. As a result, the web-based monitoring system permits customers to analyze their turbine plant fleet and perform unit-to-unit comparisons in a cost-effective and reliable manner.

In another aspect, a method for remotely monitoring a plurality of gas turbine plants using a web-based system that includes a server system coupled to a centralized interactive database and at least one client system is provided. The method includes the steps of retrieving operating data from equipment monitored at each gas turbine plant, transmitting the retrieved data to the centralized database at predetermined timed intervals, providing internal and external users access at least one of archived data and live on-line data using the web-based system, and providing users access to concurrently view operational data compiled from a plurality of gas turbine plants.

In a further embodiment of the invention, a web-site for monitoring a plurality of gas turbine plants using a web-based system that includes a server system coupled to a centralized interactive database and at least one client system is provided. The web-based system is configured to retrieve operational data from equipment monitored at each remote gas turbine plant, provide access to archived retrieved operational data, provide remote access to on-line operational data, and concurrently display operational data from a plurality of remote plants.

DETAILED DESCRIPTION OF THE INVENTION

Exemplary embodiments of systems and processes that facilitate remotely monitoring operational data from a plurality of different gas turbine plants are described below in detail. The systems and processes facilitate, for example, displaying equipment operational data files in graphical and tabular format. The systems and processes are not limited to the specific embodiments described herein, but rather, components of each system and each process can be practiced independently and separately from other components and processes described herein. Each component and process can also be used in combination with other components and processes.

Figure 1:
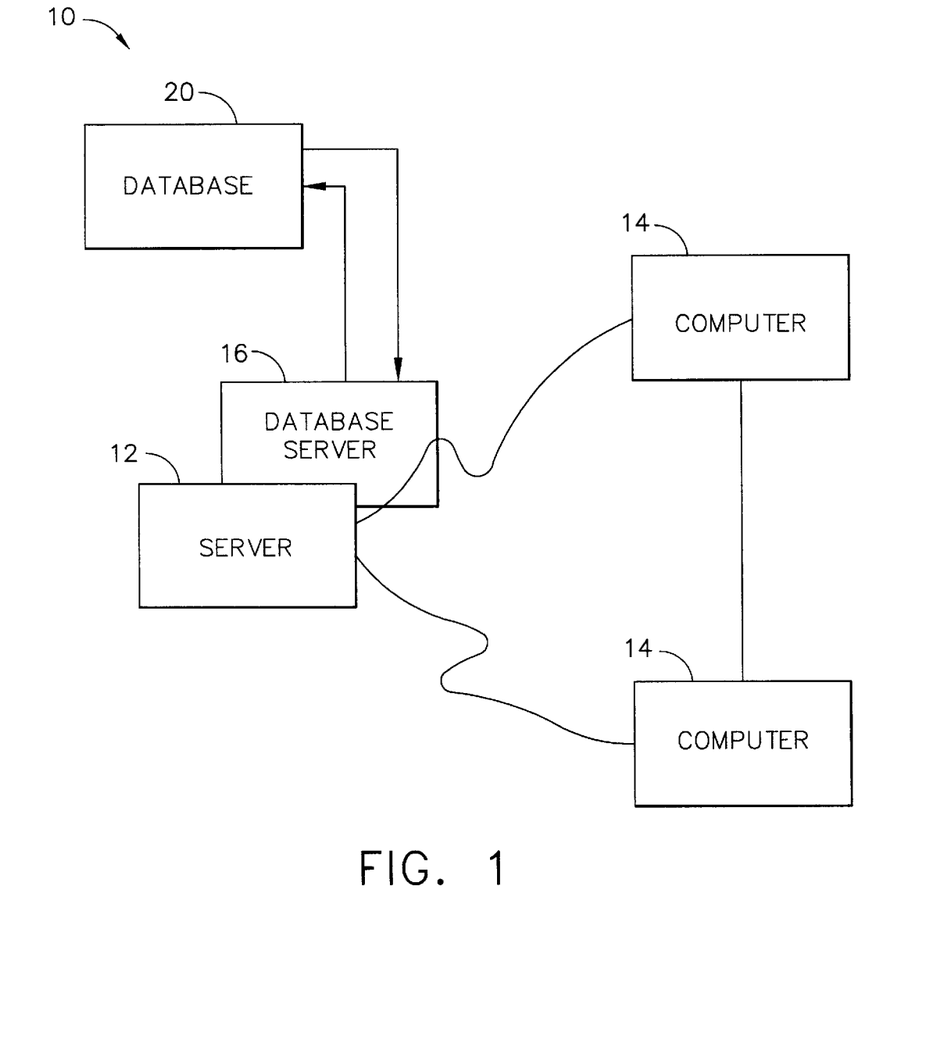
FIG. 1 is a system block diagram for a gas turbine plant monitoring system.

FIG. 1 is a system block diagram for a monitoring systemlo for remotely monitoring operational data from a plurality of turbine plants to facilitate, for example, but not limited to, plant status tracking, troubleshooting, and problem investigations. In the exemplary embodiment, system 10 monitors gas turbine plants which may be used, for example, for power generation. System 10 includes a server 12 and a plurality of devices 14 connected to server 12. In one embodiment, devices 14 are computers including a web browser, and server 12 is accessible to devices 14 via the Internet. In an alternative embodiment, devices 14 are servers for a network of customer devices. System 10 is coupled to a mass storage device (not shown). In the exemplary embodiment, server 12 includes a database server 16 coupled to a centralized database 18.

Devices 14 are interconnected to the Internet through many interfaces including through a network, such as a local area network (LAN) or a wide area network (WAN), through dial-in-connections, cable modems and special high-speed ISDN lines. Alternatively, devices 14 could be any device capable of interconnecting to the Internet including a web-based phone or other web-based connectable equipment. A database providing information relating to the plurality of plants is stored on server 12 and can be accessed by users at one of devices 14 by logging onto server 12 through one of devices 14.

System 10 is configured to provide various user interfaces whereby users access operational data from equipment monitored at the plurality of plants. Server 12 accesses stored information and downloads the requested operational data to at least one of the client systems 14, when the request to download is received from client system 14. The databases are accessed by users using client system 14 configured with a standard web browser.

Figure 2:
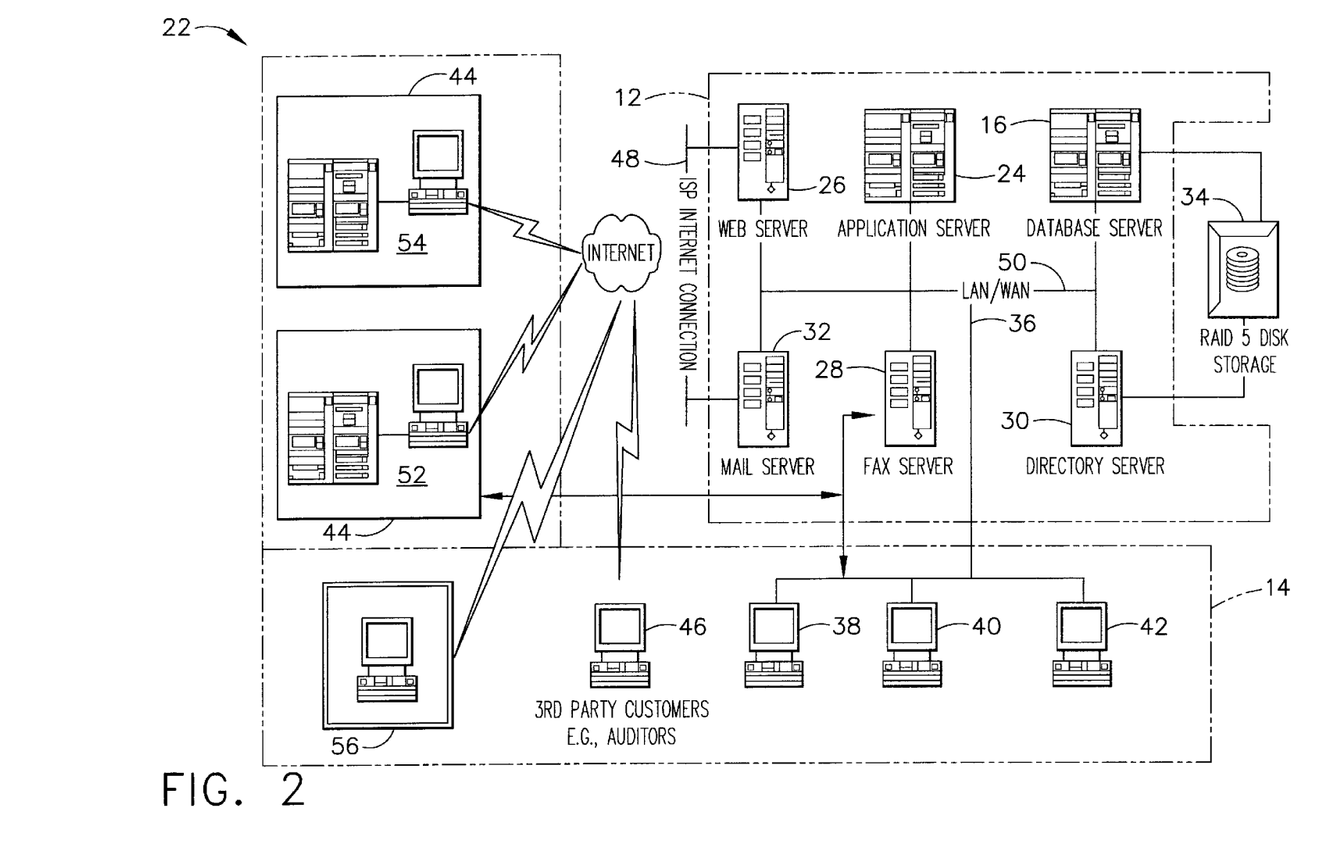
FIG. 2 is an expanded version block diagram of an exemplary embodiment of a server architecture of a gas turbine plant monitoring system.

FIG. 2 is an expanded version block diagram of an exemplary embodiment of a server architecture of a monitoring system 22 for remotely monitoring operational data from a plurality of gas turbine plants. Components of system 22, identical to components of system 10 (shown in FIG. 1), are identified in FIG. 2 using the same reference numerals as used in FIG. 1. System 22 includes server sub-system 12 and user devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator workstation 38, a user workstation 40, and a supervisor workstation 42 are coupled to LAN 36. Alternatively, workstations 38, 40, and 42 are coupled to LAN 36 via an Internet link or are connected through an intranet.

Each workstation 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server sub-system 12 is configured to be communicatively coupled to various individuals or employees 44 and to users 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any authorized individual or an employee of the business entity having a workstation 52 can access server sub-system 12. One of user devices 14 includes a senior manager's workstation 54 located at a remote location. Workstations 52 and 54 are personal computers having a web browser. Also, workstations 52 and 54 are configured to communicate with server sub-system 12. Furthermore, fax server 28 communicates with employees located outside the business entity and any of the remotely located user systems, including a user system 56 via a telephone link. Fax server 28 is configured to communicate with other workstations 38, 40, and 42 as well.

Figure 3:
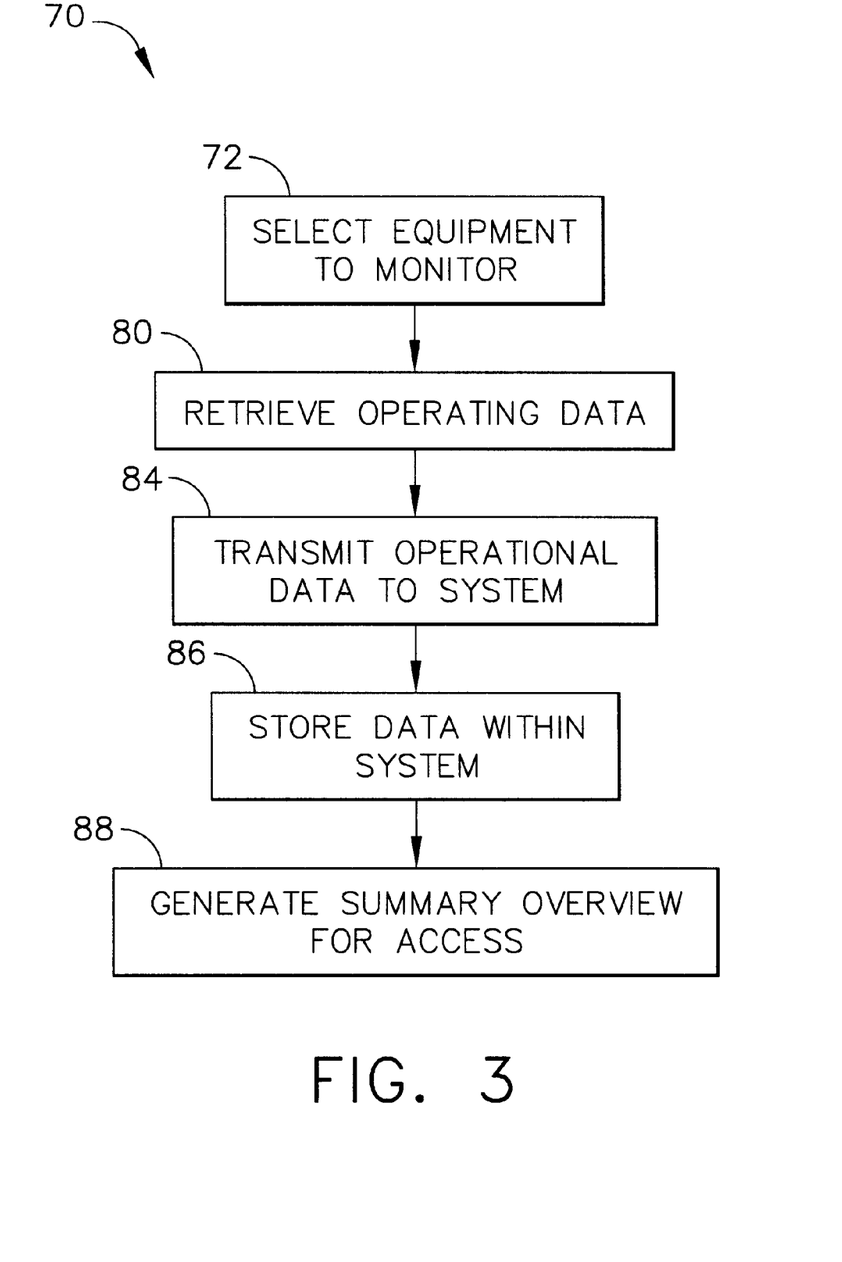
FIG. 3 is a flowchart illustrating an exemplary embodiment of a digitized method for monitoring operational data from a plurality of gas turbine plants.

FIG. 3 is a flowchart 70 illustrating an exemplary embodiment of a digitized method for monitoring operational data from a plurality of gas turbine plants (not shown). Initially, equipment to be monitored is selected 72. Such equipment may include, but is not limited to, gas turbines and/or gas turbine packages which may include generator sets, pump sets, and/or compressor sets. Monitored equipment within the plurality of gas turbine plants is equipped with a data retrieval computer (not shown) that retrieves 80 operational data from the equipment selected 72 for monitoring. More specifically, each data retrieval computer is electrically coupled to the equipment and receives signals from the equipment that are indicative of operating conditions of the equipment. For example, the data retrieval computers may receive a plurality of parameters from equipment including, but not limited to, vibrational data, operating temperatures, operating speeds, operating pressures, valve and actuator settings, fuel demand, power generation, operational setting percentages, alarms, and operating states and conditions.

Each data retrieval computer transmits 84 retrieved operational data from the monitored equipment to a monitoring system, such as monitoring system 10 (shown in FIG. 1) or monitoring system 22 (shown in FIG. 2). In one embodiment, each data retrieval computer transmits retrieved operational data at periodic predetermined timed intervals. The retrieved data is stored 86 within a database server, such as database server 16 (shown in FIGS. 1 and 2), and is not accessible to on-site personnel through each data retrieval computer. Rather, the retrieved operational data is accessible 88 by internal users, as well as internal and external customers that have been assigned access to the monitoring system. More specifically, as described in more detail below, the monitoring system enables users to view archived data from the central database, as well as live on-line data.

FIGS. 4 through FIG. 7 illustrate example web-pages for the above-described web-based monitoring system. The web-pages shown in FIGS. 4 through 7 are examples only and there are a plurality of variations possible. Through a series of user interfaces, a user is provided various useful operational data monitoring options. FIGS. 4 through 7 illustrate the type of the information accumulated, stored and updated on a regular basis to support various turbine plant monitoring systems.

The information contained in these user interfaces, i.e., web-pages, is exemplary only and may change from one turbine plant monitoring system to another. The information provided through the user interfaces depicted in FIGS. 4 through 7 is stored in a centralized database within centralized database 18 (shown in FIG. 1) and retrieved by server system 12 (shown in FIG. 1) as required, and as described above. Many variations of particular user interfaces viewable by the customer may be utilized. The following description refers to one set of web-pages that can be used to prompt the user to retrieve a variety of operational data for remotely monitoring a plurality of turbine plants. Of course, many variations of such web-pages are possible.

Figure 4:
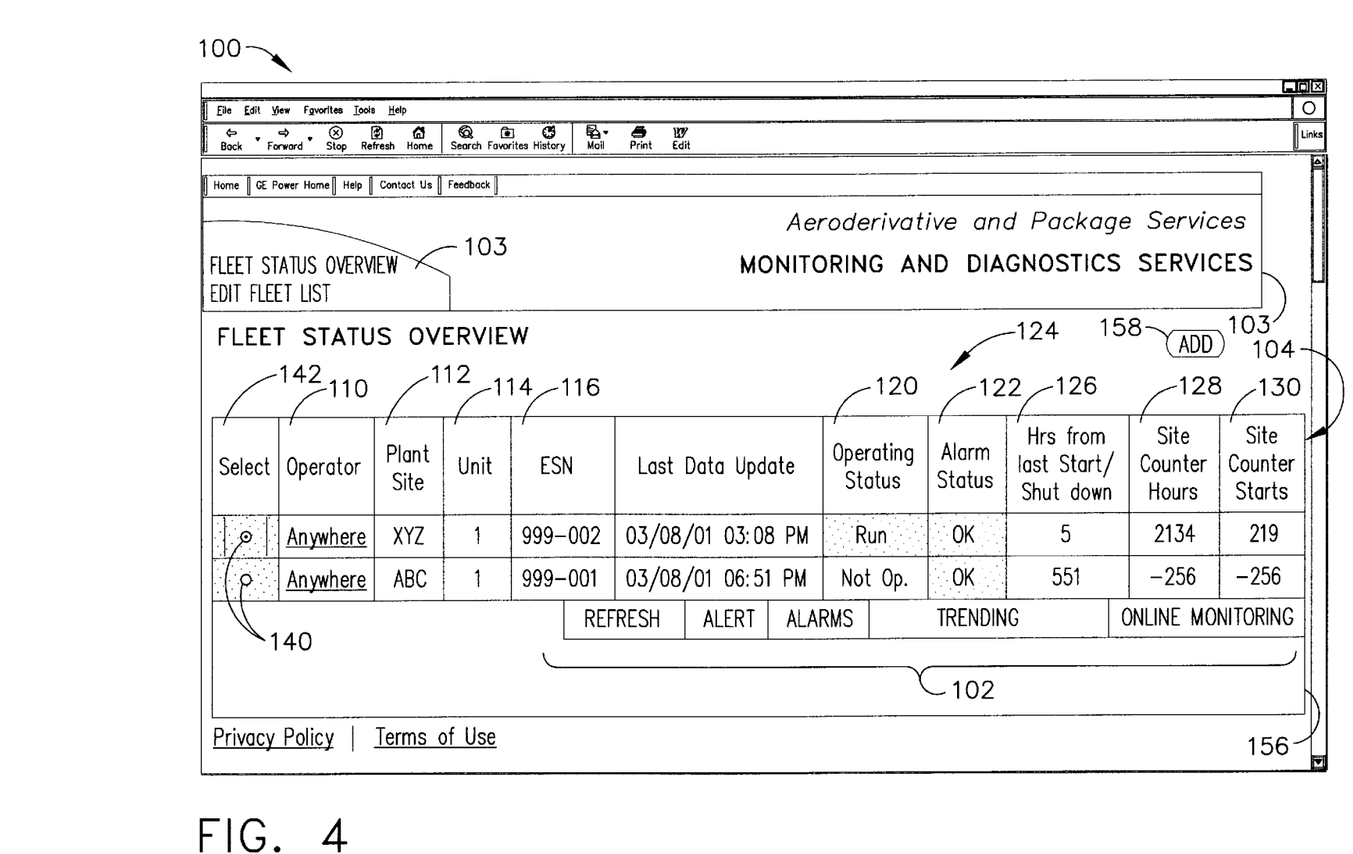
FIG. 4 is an exemplary embodiment of a fleet status web-page used in executing the flowchart shown in FIG. 3.

FIG. 4 is an exemplary embodiment of a fleet status overview/home page 100 used with a monitoring system, such as monitoring system 10, for monitoring a plurality of turbine plants, and from which various monitoring modular features 102 can be launched by a user. Home page 100 is only accessible by an external customer or internal user that has a pre-defined security access. Furthermore, home page 100 is organized to increase users' productivity by providing operational data from a plurality of remote turbine plants. Home page 100 limits which modular features 102 a customer may access. Home page 100 provides a methodology to restrict which operational data a user may access. Specifically, users are restricted to accessing operational data to which the user has been assigned security access, and as such, home page 100 is personalized to the user. More specifically, selecting hyperlink text "Edit Fleet List" 103 enables a user to view a listing of plants that the user has security access for monitoring. Furthermore selecting text 103 enables a user to personalize home page 100.

Home page 100 provides a overview 104 of a plurality of turbine plants, and is personalized such that an external customer may only view turbine plants that the customer has been granted security access. Overview 104 displays a series of key parameters, described in more detail below, which reflect an operating status of the plurality of plants being monitored, based on the most recent download of operating data stored within the central database. Specifically, home page 100 includes an operator column 110 and a plant site column 112 which identify each specific turbine plant. More specifically, overview 104 enables a user to concurrently view parameters from a plurality of remote plant sites 112. As such, home page 100 enables a user to view data from a plurality of different plants through overview 104.

A unit column 114 identifies a particular unit for a particular operator and site location. An ESN column 116 provides an identification number that is unique to the equipment being monitored. Summarizing overview 104 also includes an operating status column 120 that indicates whether the equipment being monitored is operating, and an alarm status column 122 that indicates whether the equipment being monitored includes any key parameters that are in a pre-defined abnormal operating condition.

Home page 100 also includes a plurality of columns 124 that indicate operating hours unique to the equipment being monitored. More specifically, home page 100 includes a column 126 indicating an amount of hours that have elapsed since the equipment being monitored was last started or shut-down, a column 128 indicating an amount of plant site counter hours or total hours that the equipment has operated, and a column 130 indicating an amount of plant counter starts, or a total number of times the equipment has been started. In one embodiment, values within columns 124 are calculated by the monitoring system.

Activating a radio button 140 in a select column 142 enables a user to perform additional actions within the monitoring system to operational data received from monitored equipment within summarizing overview 104. A user may also select a refresh modular feature 150. In addition, when radio button 140 is selected, an alarm modular feature 152, a trending modular feature 154, and/or an on-line monitoring modular feature 156 may be selected. More specifically, depressing refresh application 150 enables a user to view the most recent operational data transmitted to the monitoring system including any data that may have been transmitted to the monitoring system after summarizing overview 104 was initially displayed.

If an internal user, such as an administrator, has pre-defined read/write security access, then such a user may select an add button 158 to add additional plants to the monitoring system, or change security access levels of users within the monitoring system.

Figure 5:
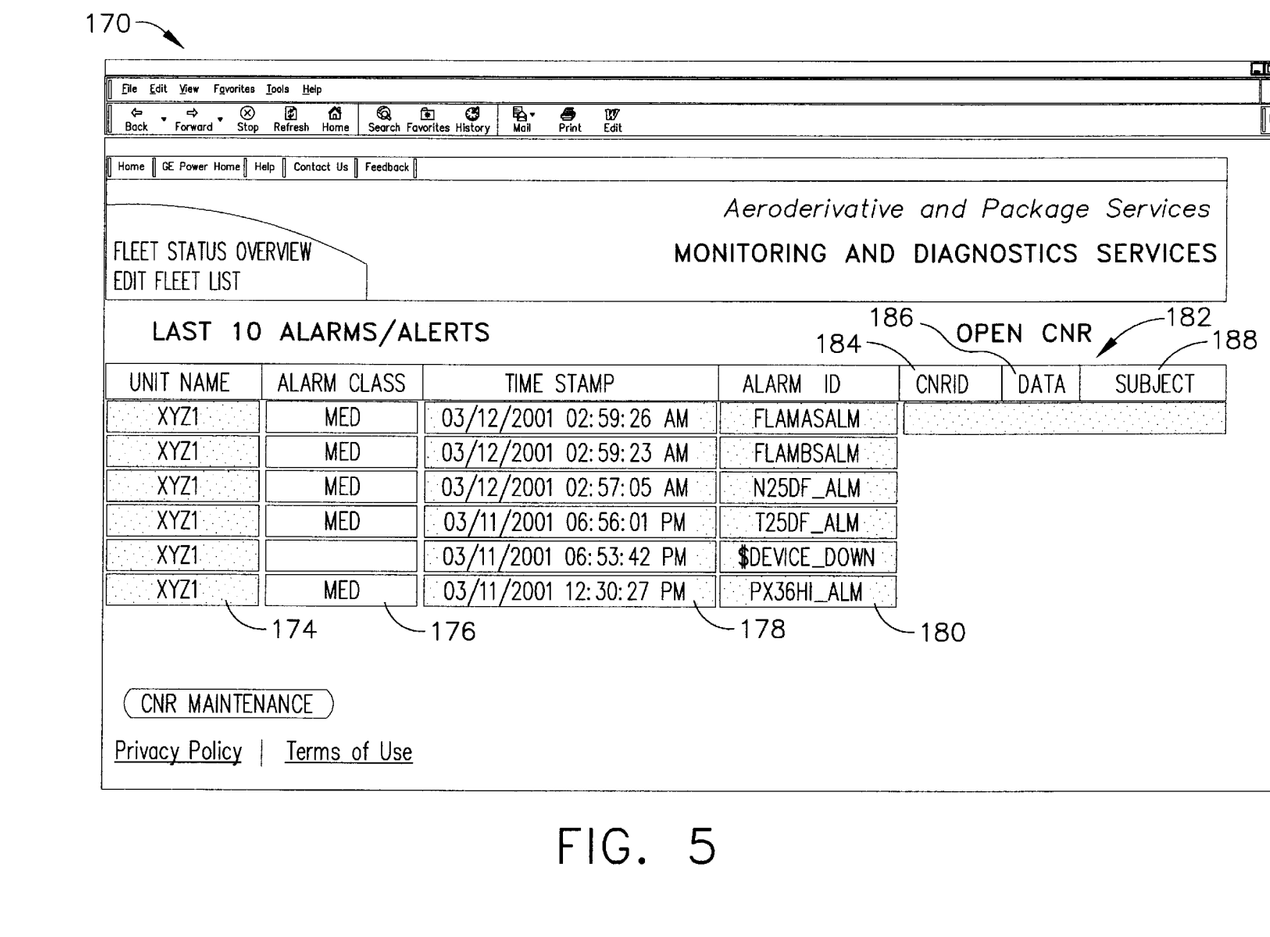
FIG. 5 is an exemplary embodiment of an alarm web-page used in executing the flowchart shown in FIG. 3.

FIG. 5 is an exemplary embodiment of an alert/alarm modular feature web-page 170 used with a monitoring system, such as monitoring system 10, for monitoring a plurality of turbine plants. More specifically, web-page 170 is displayed after a user has selected alert/alarm modular feature 152 (shown in FIG. 4) from home page 100 (shown in FIG. 4). Web-page 170 displays a listing of up to ten parameters that are being monitored and are detected to be within a pre-defined abnormal operating condition. Furthermore, three alarm levels are defined including a low level alarm status, a medium level alarm status, or a high level alarm status.

Web-page 170 includes a unit name column 174 that identifies a name of the equipment being monitored. An alarm classification column 176 identifies the proximity of the key parameter being monitored to the pre-defined operational limit for that parameter. In the exemplary embodiment, alarms are classified as being low, medium, or high; and are color-coded when displayed within web-page 170. A time stamp column 178 identifies a date and time that the specific alarm or alert being displayed within web-page 170 was generated within the plant being monitored. An alarm identification column 180 identifies each alarm with a reference identification.

Web-page 170 also includes a customer notification report, CNR, feature 182, that enables a user to view notification reports regarding equipment parameters that are being monitored in an alert or alarm status. More specifically, after a CNR has been entered into the monitoring system, it is displayed on web-page 170. Each CNR is assigned a identification number that is displayed in CNRID column 184, and a date of assignment, that is displayed in a date column 186. Additionally, a subject column 188 provides a brief description of the CNR.

Figure 6:
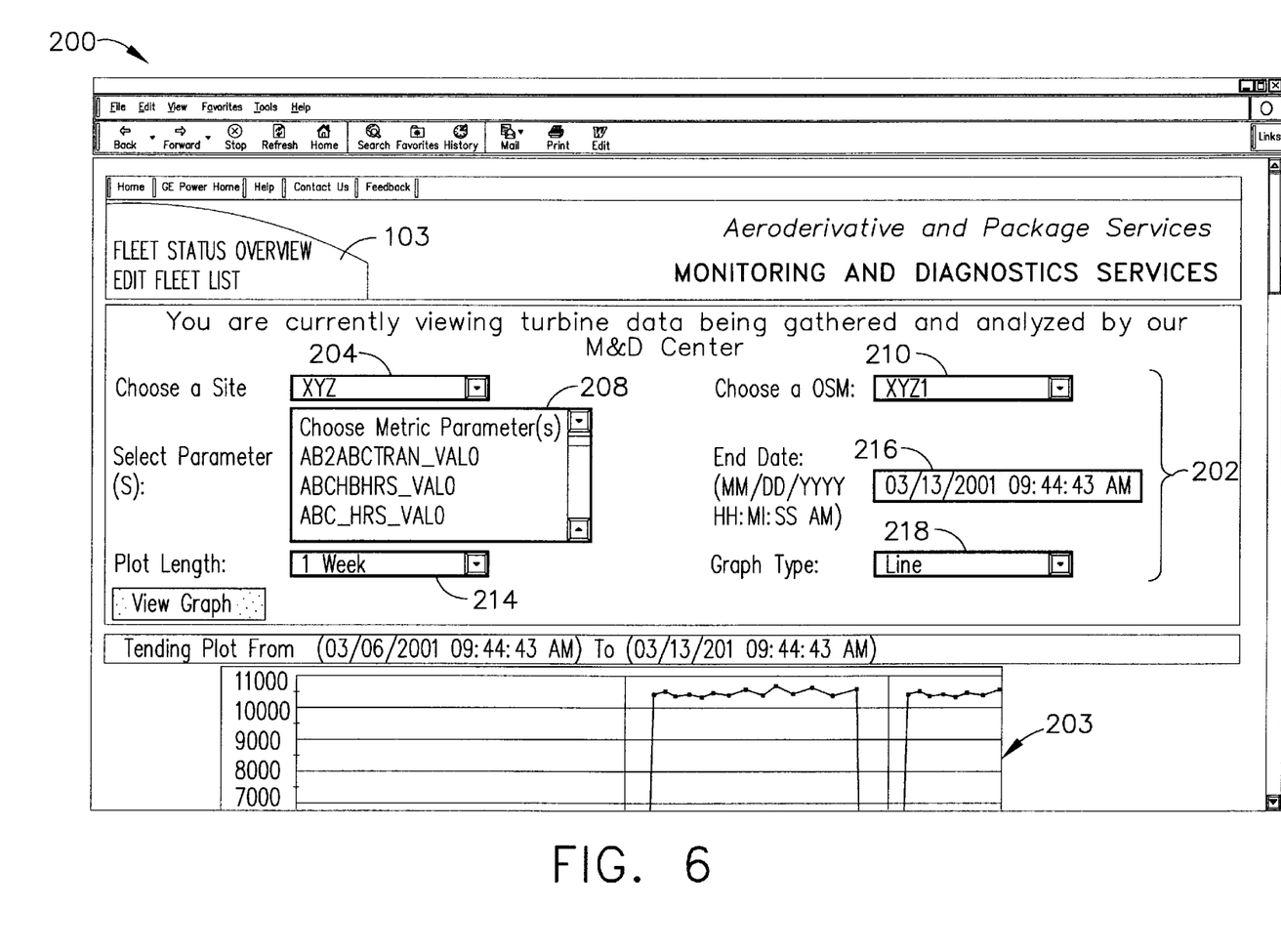
FIG. 6 is an exemplary embodiment of a trending web-page used in executing the flowchart shown in FIG. 3.

FIG. 6 is an exemplary embodiment of a trending modular feature web-page 200 used with a monitoring system, such as monitoring system 10, for monitoring a plurality of turbine plants. More specifically, web-page 200 is displayed after a user has selected trending modular feature 154 (shown in FIG. 4) from home page 100 (shown in FIG. 4). Web-page 200 displays a graphical representation of values for a key parameter selected. More specifically, web-page 200 includes a plurality of menus 202 that enable a user to select trending and graphical options to enable the monitoring system to generate a trending plot 203 that graphically displays the value of a monitored parameter selected over a fixed time period. Such trending plots facilitate, for example, a user determining plant status tracking, troubleshooting, or problem investigations.

A first pull-down menu 204 enables a user to select a site to be analyzed. A select parameter pull-down menu 208 enables a user to select a parameter being monitored from the site selected with menu 204. Alternatively, select parameter pull-down menu 208 enables a user to select a plurality of monitored parameters for trending. Additionally, an on-site monitor, OSM, or data retrieval computer, may be chosen using pull-down menu 210.

Web-page 200 also enables a user to select graphical options for the trends being created. More specifically, a plot length pull-down menu 214 enables a user to select the length of time through which the graphical trending plots are created, and an end date data entry field 216 enables a user to select a date that the graphical trending plots are stopped.

Furthermore, a graph type pull-down menu 218 enables a user to select a type of graphical display to be created.

Figure 7:
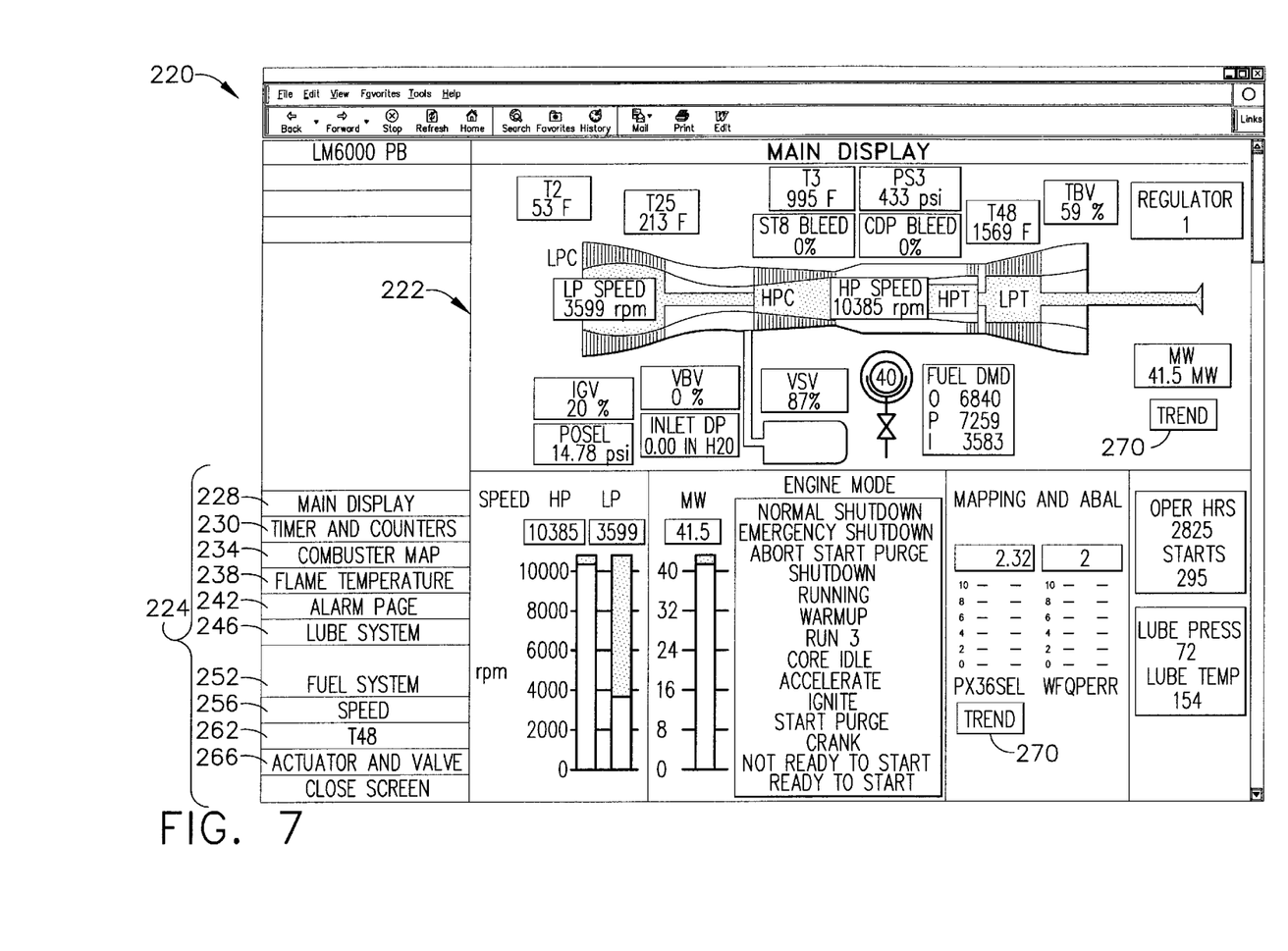
FIG. 7 is an exemplary embodiment of an on-line monitoring web-page used in executing the flowchart shown in FIG. 3.

FIG. 7 is an exemplary embodiment of an on-line modular feature web-page 220 used with a monitoring system, such as monitoring system 10, for monitoring a plurality of turbine plants. More specifically, web-page 220 is displayed after a user has selected on-line monitoring modular feature 156 (shown in FIG. 4) from home page 100 (shown in FIG. 4). Web-page 220 enables a user to view on-line real time operational data from a plant selected using home page 100. More specifically, web-page 220 includes a graphical representation section 222 and an options section 224.

Graphical representation section 222 displays graphical representations of equipment. A graphical representation of the turbine engine is displayed and includes values of a plurality of on-line operational data parameters that are selectable by the user using options section 224. Such graphical representations vary depending selections of the user within options section 224. The turbine engine is displayed as a default setting.

Options section 224 includes a main display option 228 which enables a user to view the turbine engine default display. In one embodiment, a user may selectively view on-line values of turbine parameters, including but not limited to a plurality of operating speeds, operating pressures, regulator settings, and vane settings.

A timers and counters option 230 enables a user to view on-line values of parameters previously selected for display using web-page 100. More specifically, timers and counters option 230 enables values representing an amount of operating hours of the equipment, and a number of starts of the equipment to be displayed.

A combustor map option 234 enables a user to remotely view on-line values of key parameters within a gas turbine combustion system being monitored. For example, values representing operating temperatures and pressures within the combustor, fuel demand, and a percentage of bleed may be displayed.

A flame temperature option 238 enables a user to view on-line flame temperature parameters within the turbine being monitored, and an alarm mode option 242 enables a user to view alarm status and/or historical status on-line. Furthermore, a lube system option 246 enables a user to display on-line values of key parameters within the turbine lube system. In the exemplary embodiment, values representing lube pressure and lube temperature are displayed.

A fuel system option 252 enables a user to view on-line values of key parameters within the turbine fuel system. In the exemplary embodiment, values representing fuel demand, fuel pressure, and valve position percentages are displayed. A speeds option 256 enables a user to view on-line values of key operational speed parameters, such as a speed of a low pressure turbine rotor, or a speed of a high pressure turbine rotor. A T48 option 262 displays on-line values of key temperature values within the turbine being monitored, and an actuator and valve option 266 displays on-line values of actuator and valve positions within the turbine being monitored.

Additionally, web-page 220 includes a plurality of hyperlink buttons 270 which enable a user to view trending plots of key parameters being monitored.

While the invention has been described in terms of various specific embodiments, those skilled in the art will recognize that the invention can be practiced with modification within the spirit and scope of the claims.

What is claimed is:

1. A method for remotely monitoring a plurality of gas turbine plants using a web-based system including a server sub-system coupled to a centralized interactive database and at least one client system, said method comprising the steps of:

retrieving operating data from equipment monitored at each plurality of gas turbine plants;

transmitting retrieved data to the centralized interactive database at pre-determined timed intervals;

providing users access to at least one of archived data and live on-line data using the web-based system; and providing users access to data from the plurality of different gas turbine plants through a web-page overview, such that operational data from the plurality of different gas turbine plants is concurrently viewable.

2. A method in accordance with claim 1 said step of retrieving data further comprises the step of using a data retrieval computer to receive operating data from each plurality of gas turbine plants.

3. A method in accordance with claim 1 wherein said step of transmitting data further comprises the step of using a data retrieval computer to transmit operating data from each plurality of gas turbine plants.

4. A method in accordance with claim 1 further comprising the step of providing internal and external users access to an alarm/alert module for summarizing at least one of an alert status and an alarm status of operating equipment.

5. A method in accordance with claim 1 further comprising the step of providing internal and external users access to a trending utility module for graphically displaying operational trending.

6. A method in accordance with claim 1 further comprising the step of providing internal and external users access to a module for on-line monitoring of operating equipment within said plurality of gas turbine plants.

7. A web-based system for monitoring a plurality of different gas turbine plants, said system comprising a client system comprising a browser;

a centralized database for storing information;

a server system configured to be coupled to said client system and said database, said server system further configured to:

retrieve operational data from the plurality of different gas turbine plants;

store data in said centralized database;

summarize data from a plurality of different gas turbine plants in an overview, such that operational data from the plurality of different gas turbine plants is concurrently viewable; and generate graphical representations of the operational data based on the stored data.

8. A web-based system in accordance with claim 7 further comprising a plurality of data retrieval computers configured to:

retrieve operational data from equipment monitored at each plurality of different gas turbine plants;

and transmit retrieved data to the centralized database at pre-determined timed intervals.

9. A web-based system in accordance with claim 8 further configured to provide an alert status of operating equipment monitored within the plurality of different gas turbine plants.

10. A web-based system in accordance with claim 8 further configured to provide an alarm status of operating equipment monitored within the plurality of different gas turbine plants.

11. A web-based system in accordance with claim 8 further configured to generate graphical operational trends of equipment monitored within the plurality of different gas turbine plants.

12. A web-based system in accordance with claim 8 further configured to provide on-line monitoring of equipment monitored within the plurality of different gas turbine plants.

13. A web-based system in accordance with claim 8 further configured to provide on-line monitoring of equipment monitored within the plurality of different gas turbine plants, including at least one of operational temperatures, operational speeds, and operational pressures.

14. A web-site for monitoring a plurality of gas turbine plants using a web-based system including a server system coupled to a centralized interactive database and at least one client system, the server system configured to retrieve operational data from equipment monitored at each remote plurality of gas turbine plant, said web-site configured to:

provide access to archived retrieved operational data;

provide remote access to on-line operational data; and display data from a plurality of remote plants through a web-page, such that operational data from the plurality of gas turbine plants is concurrently viewable.

15. A web-site according to claim 14 further configured to limit user access to operational data based on individual access privileges.

16. A web-site according to claim 15 further configured to provide access to a trending utility for graphically displaying operational trends of equipment monitored within the plurality of gas turbine plants.

17. A web-site according to claim 16 further configured to provide access to an alarm/alert module for displaying at least one of an operational alarm status and an operational alert status of equipment monitored within the plurality of gas turbine plants.

18. A web-site according to claim 16 further configured to display graphical representations of operational data based on retrieved operational data, said web-site further configured to receive inputs representing graphical display options.

19. A web-site in accordance with claim 18 wherein said web-site further configured to receive graphical display option inputs representing at least one of a graph type, a trend length, and an ending trend date.

* * * * *